United States Patent
Johnson et al.

[15] 3,683,511
[45] Aug. 15, 1972

[54] METHOD OF REMOVING VOLATILES FROM AN ELASTOMER

[72] Inventors: Charles R. Johnson; Seid H. Moosavian, both of Akron, Ohio

[73] Assignee: The Firestone Tire & Rubber Company, Akron, Ohio

[22] Filed: Sept. 4, 1970

[21] Appl. No.: 69,806

[52] U.S. Cl..................................................34/9
[51] Int. Cl..............................................F26b 3/00
[58] Field of Search...............34/9, 12, 17; 425/204

[56] References Cited

UNITED STATES PATENTS 3,409,937  11/1968  Klosek et al..............425/204
2,833,750   5/1958  Vickers.....................34/12 X
3,225,453  12/1965  Burner..........................34/12
3,222,797  12/1965  Zies...............................34/17

*Primary Examiner*—John J. Camby
*Attorney*—S. M. Clark and Gordon B. Seward

[57] ABSTRACT

Volatile hydrocarbons are removed from an elastomer by mechanically working the elastomer in an extruder to increase its temperature, admixing an inert gas or water through at least one inlet, allowing vapors to flash from the mixture through at least one vented section in the extruder and discharging the elastomer from the end of the extruder at a lower content of volatile hydrocarbons. Oil, antioxidant and other elastomer compounding materials can optionally be added during the operation.

14 Claims, 4 Drawing Figures

Patented Aug. 15, 1972 3,683,511

METHOD OF REMOVING VOLATILES FROM AN ELASTOMER

CROSS-REFERENCE TO RELATED APPLICATION

This application is related to copending application Ser. No. 69,857, filed Sept. 4, 1970, entitled "DESOLVENTIZING APPARATUS," in the names of William R. Nissle, R. Kent Slaby, and Dean K. Bredeson, and assigned to the French Oil Mill Machinery Company.

BACKGROUND OF THE INVENTION

This invention relates to a method of continuously removing volatile hydrocarbons from an elastomer.

In the manufacture of synthetic rubber by polymerization in an organic diluent medium, the polymer produced must be dried or separated from the diluent before it can be used. In the past, a number of methods for accomplishing this result have been proposed. The most popular method of de-solventizing synthetic rubber involves coagulation of the rubber in solvent solution by discharging it into water and heating the water so as to steam-distill off the diluent and precipitate the polymer into crumbs. The crumb is then dried in a conventional manner, such as by means of a de-watering press and a hot air oven drier.

Alternative methods for removing the water from rubber crumb have employed a screw extruder containing vents along the barrel, through which water vapor passes as the rubber is kneaded and masticated in the extruder. A method and apparatus of this type are shown in U.S. Pat. No. 3,225,453, wherein wet rubber crumb is dried essentially completely by passing it through a vented extruder. The extruder performs mechanical work on the rubber to heat it and to express water from it, and the water in liquid and vapor form is expressed through drainage openings extending the length of the extruder. This process has been found effective in removing water from rubber, since the tearing action of the extruder opens pockets of water contained within the crumb to release moisture.

More recent techniques for drying solution-polymerized elastomers have attempted to avoid the step of coagulation in water. In these newer methods the problem is one of removal of organic diluent only, presenting a new and different system for polymer drying. Since the elastomer and diluent are mutually miscible throughout all proportions, in most cases, the situation differs considerably from the process described in the reference patent wherein all the volatile material (water) is immiscible with the elastomer.

SUMMARY OF THE INVENTION

It is an object of this invention to provide a method for continuously removing volatile hydrocarbons from an elastomer by the use of a vented extruder. It is another object of this invention to remove essentially all of the volatile hydrocarbon absorbed within an elastomer by a simple continuous method. The method of the invention can be briefly summarized as follows:

An elastomer which contains volatile hydrocarbons to be removed is charged continuously into an extruder and mechanically worked to increase its temperature. An inert gas or water is introduced through an inlet in the extruder and is mixed with the elastomer. The mixture passes through the extruder and enters a vented section in the extruder wherein vapors flash from the mixture and escape. The elastomer is then discharged from the end of the extruder at a lower content of volatile hydrocarbons. Optionally, the elastomer may be subjected to a plurality of mechanical work operations, each followed by a flash operation, to provide greater efficiency in removing the volatile hydrocarbons. A further option consists of adding oil to the mixture at some point in the extruder to produce a mixture of oil and elastomer, when such a mixture is desired. A still further option feeds the de-volatilized elastomer into a second extruder, wherein the desired amount of oil is admixed.

If it is desired to add other compounding ingredients such as fillers, or vulcanization ingredients and the like to the elastomer, the addition can be made at any convenient point during the process.

DETAILED DESCRIPTION OF THE INVENTION

Figure 1:
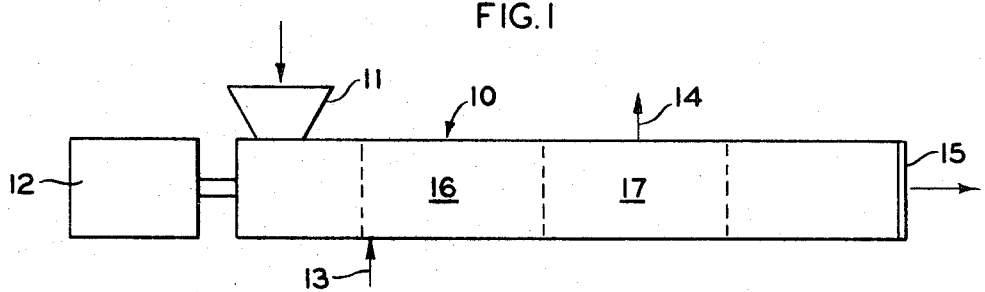

The elastomers which can be treated in the method of the invention include natural rubber and various types of synthetic rubber. The term synthetic rubber includes polybutadiene, polyisoprene, copolymers of butadiene or isoprene with styrene, chloroprene rubber, butyl rubber, or EPDM. The method is especially effective in treating polybutadiene rubber and copolymers of butadiene and styrene which contain more than 50 percent butadiene. The method is applicable to elastomers of a wide range of molecular weights and can be used effectively on elastomers having a Mooney viscosity ($ML_4$ at 100° C.) of from about 10 to about 180. Blends of two or more elastomers can also be treated.

The volatile materials which can be removed in the method of the invention are usually organic liquids used as diluents in the polymerization process. More commonly, the volatiles are hydrocarbons of from four to 10 carbon atoms, such as butanes, pentanes, hexanes, heptanes, benzene, toluene, cyclohexane and the like. Un-reacted monomers can also be present in small amounts in the case of synthetic elastomers. The method is effective in removing volatiles which are present in the elastomer in the amount of up to 40 percent by weight based on total solids, usually between 10 and 30 percent by weight. In general, elastomers containing higher amounts of diluent tend to be somewhat soft and putty-like and are more difficult to handle. Elastomers which are of higher molecular weight can be treated containing as much as 50 percent volatile materials by weight based on total solids.

The inert gas employed in the method of the invention can be any gaseous material which will be unreactive with the elastomer or diluent. Elemental gases such as nitrogen, argon, neon, helium, etc. can be used very effectively. Of these, nitrogen is preferred for reasons of cost. Oxygen or oxygen-containing gases such as air are not recommended since oxygen has a degrading effect upon unstabilized elastomers at high temperatures. Additionally, the use of oxygen or oxygen-containing gases together with the volatile hydrocarbons presents a potential fire hazard.

The use of water in the method of the invention presents advantages in several areas of the operation. Water, being immiscible with most of the volatiles encountered, produces a steam-distilling effect in removing the volatile materials. Additionally, water vapor which escapes with the volatile materials can be easily condensed and separated in a solvent recovery system. If desired, both water and an inert gas can be employed in the same operation, though they will preferably be added at different inlet points. In some applications, steam may be used, and can provide additional heat, if required. If it is desired to remove heat from the system, water is an ideal additive, since its relatively high heat of vaporization permits considerable heat removal.

In the case where polymers are employed which contain residual initiator or "live ends" and it is desired to recycle the volatiles, the use of an inert gas rather than water may be preferred, since water mixed with the volatiles would regenerate acetylenes, which are undesirable materials in polymerization. This is especially true in the case of elastomers produced with lithium initiators.

The amount of water or inert gas used depends on such factors as the type of elastomer to be treated, the amount and type of volatiles to be removed, and the temperatures which can be used. In general, from 0.1 per cent by weight to 10 per cent by weight of water or inert gas, based on the total charge of elastomer and volatiles, is effective. Preferred amounts of water or inert gas range from about 1 per cent to 7 per cent by weight, based on the total charge of elastomers and volatiles.

As an example of the effect of elastomer type on the amount of water or inert gas used, it has been found that low addition levels are preferred when working with elastomers having a high Mooney viscosity, since fewer "fines" are produced at the extruder discharge point. Conversely, with low Mooney elastomers, higher additive levels tend to minimize the plugging of vents by soft, sticky polymer deposits. It has been found, surprisingly, that higher Mooney elastomers can be devolatilized at a greater throughput-per-horsepower ratio than elastomers having lower Mooney viscosities. A possible explanation for this effect is that the higher Mooney materials have a greater tendency to fracture when undergoing shear, thus liberating volatiles more readily.

Temperature limitations are primarily dictated by the boiling point of the volatiles, the stability of the polymers at high temperature, and the limitations of the equipment. While high temperatures favor more efficient removal of volatiles, it is usually undesirable to operate with polybutadiene or styrenebutadiene copolymers at temperatures much in excess of 200° C. Operation below 100° C. is generally inefficient, unless only low boiling materials must be removed.

Removal of volatiles can be accomplished at atmospheric pressure, and it is usually most advantageous to operate at an pressure of about one atmosphere. If desired, however, the system can be operated at a partial vacuum, or under a pressure of up to 10 atmospheres or more. Pressures will be determined usually by the conditions under which solvent recovery operations are to be performed.

In the recovery of solvent, water vapor can be condensed along with the volatile hydrocarbons, and separated by decanting. "Un-condensable" materials, such as inert gases, can be separated in the recovery system and recycled. If water is employed, further drying or purifying processes can be used to obtain water-free volatile hydrocarbons for recycling.

Oil can be added to the elastomer either before or after the volatile hydrocarbons have been removed. For some applications, as much as 50 or more parts by weight of oil per 100 parts of elastomer may be desired in the finished product. It has been found, however, that the admixture of oil to an elastomer which contains water is quite difficult, probably because of the lubricating effect of the oil-water combination. Thus any added oil should either be essentially completely mixed before introducing water, or added after the water is removed. When high Mooney elastomers are being treated it has been found beneficial to add a small amount of oil before the discharge point, to soften the elastomer and facilitate the discharge of the product at the end of the extruder. This amount can be from about one to 15 parts by weight of oil per 100 parts of elastomer, preferably from about 3 to about 7 parts by weight per 100 parts of elastomer.

An antioxidant is normally used with the elastomers, and it can be added with the oil, in highly concentrated solvent solution, or with the water (if used), suitably dispersed.

Referring to the drawings, one embodiment of the method of the invention is shown in FIG. 1 wherein elastomer containing volatile hydrocarbons is charged into the hopper 11 of an extruder indicated generally at 10, which is driven by a drive mechanism 12. Water or inert gas is injected at inlet 13 and the elastomer undergoes mixing in mixing section 16. The mixture passes into venting section 17 where volatile material is flashed off at vent 14. The elastomer then is discharged at the end of the extruder through die plate 15.

Figure 2:
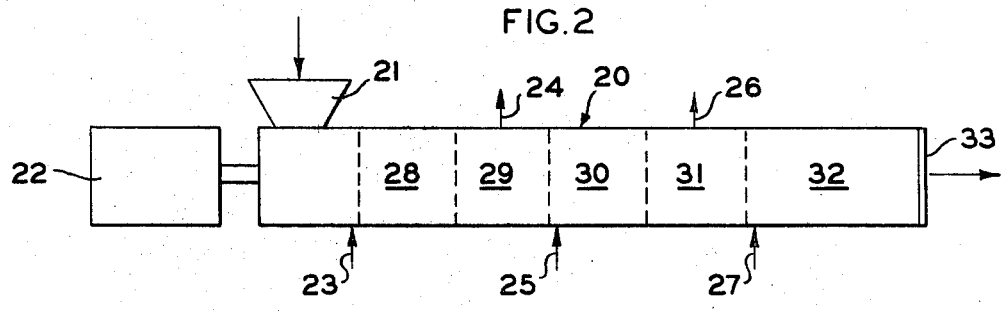

FIG. 2 represents an alternative embodiment of the method employing two successive introductions of water or inert gas each followed by a venting operation. Here the elastomer containing volatile hydrocarbon is charged into an extruder indicated generally at 20 through hopper 21. The extruder is driven by drive mechanism 22. Water or inert gas in introduced at inlet 23 and the combined materials are mixed in the first mixing section 28. The materials then pass into the first venting section 29 where volatiles flash off, and leave through vent 24. As the elastomer enters the second mixing section 30 more water or inert gas is introduced at the second inlet 25 and the combined materials are again mixed. The materials pass into the second venting section 31 where the volatiles are again flashed and vented through vent 26. Oil is introduced at inlet 27 and mixed with the elastomer in the final mixing section 32 and the combined materials are discharged at the end of the extruder through die plate 33.

Figure 3:
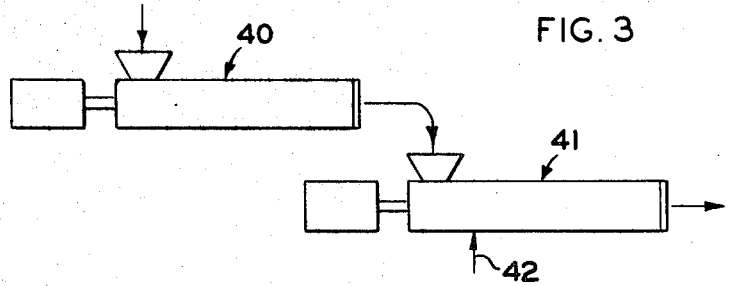

FIG. 3 shows still another embodiment of the method wherein two extruders 40 and 41 are operated in series. Elastomer enters the first extruder 40 wherein de-solventizing operations (not shown) are performed as before. De-solventized elastomer then is discharged from extruder 40 into extruder 41. Oil is added at inlet 42 and then mixed with the elastomer. The combined materials are discharged at the downstream end of the extruder 41.

When substantial amounts of oil (from 20 to 50 or more parts by weight) are to be added to the elastomer, the use of a second extruder is especially recommended. Experiments have shown that adequate mixing of the oil into the elastomer can be obtained with a minimum residence time of about 1½ minutes for 37 parts of oil in 100 parts of a high-Mooney butadiene-styrene copolymer containing about 80 percent butadiene.

The elastomers which are treated by the method of the invention can be further treated by any known method as may be desired. For example, the elastomer discharged from the final extruder can be chopped into finer particles in a hammer mill and then baled for shipment. The elastomers desolventized by the method of the invention can be further compounded according to well known methods to produce a variety of usable objects such as tires, hose, molded items, etc.

The discharge orifice at the downstream end of the extruder has been described as a die plate. This orifice may, however, be of any convenient construction to provide the desired size and shape of elastomer particles and to produce a workable back-pressure in the extruder. Experiments indicate that best results are usually obtained when the die plate design presents a minimum resistance to flow, producing minimum back-pressure at this point. For example, the die plate can have an interrupted annular orifice, and be equipped with a rotary cutter blade. In this arrangement, a number of extrusions having a roughly trapezoidal shape are produced around the plate, and the speed of the rotary knife will determine the thickness of the particles as the extrusions are severed. This latter arrangement is found to be especially effective when working with high-viscosity elastomers.

Although the pair of extruders in series shown in FIG. 3 operate with a free discharge of elastomer from the first to the second, the two extruders can optionally be coupled so that the first extruder discharge is sealed to the feed section of the second extruder.

In order that the mixing section of the extruder be kept under pressure while the additives are being mixed into the elastomer the extruder barrel can contain a restriction, thus limiting the cross-section area through which the mixture passes. A constriction of the barrel at the inlet points for water or inert gas will also facilitate mixing. Constrictions are found to be quite helpful wherever a seal is desired between two adjacent successive sections of the extruder. Since the elastomer is squeezed into a thin section when it passes through a constriction, and thus permits easy escape of volatile materials, a constriction is preferably employed just before the vent section. Clearance in the constricted sections is advantageously less than 4 mm., and will vary depending on the nature of the mixture. Means can be provided to vary the clearance, either manually or automatically as desired. Control of clearance can be based on temperature measurements taken on the mixture in process. Additional temperature control can be achieved by providing heating or cooling jackets on the extruders.

Vent sections in the extruder can be of any construction which facilitates removal of the volatiles without excessive entrainment of elastomer particles. The apparatus described in the the cited U.S. Pat. No. 3,225,453 contains vent sections which are described in the patent (at lines 18–44 of column 7) as sections lined with bars extending longitudinally of the extruder, which bars are spaced slightly apart by suitable spacer members, forming drainage openings between adjacent bars. The drainage openings permit the passage of liquids or vapors from the sections, but solids being compressed or worked within the section are contained therein. As noted, however, the vent sections of the cited patent extend the full length of the extruder. Suitable vent sections for the method of the invention occupy only a portion of the extruder length, and the remaining portions are solid.

In order to facilitate collection of the vapors which leave the extruder, the vent sections can be enclosed by a collection chamber or housing. The vapor can then be sent to a recovery system for condensing and separating the volatiles.

It has been found that in the practice of the method using an extruder which has vented sections containing slatted bars a small amount of fine particles of elastomer will sometimes escape with the vapors. These fines can be collected and removed from the vent areas by employing a fine spray of water on the outer surface of the extruder to wash the fines into a collection point, from which point the slurry of fines can be re-introduced into the extruder and re-cycled through the process. The water content of the slurry can be reduced by any convenient means, and the wet crumb injected under pressure into the extruder. The included water can form a portion of the required water addition. Alternatively, a hydrocarbon solvent can be used to collect the fines in a similar way. The amount of fines usually encountered is seldom in excess of about 0.5 percent by weight, based on the elastomer.

Figure 4:
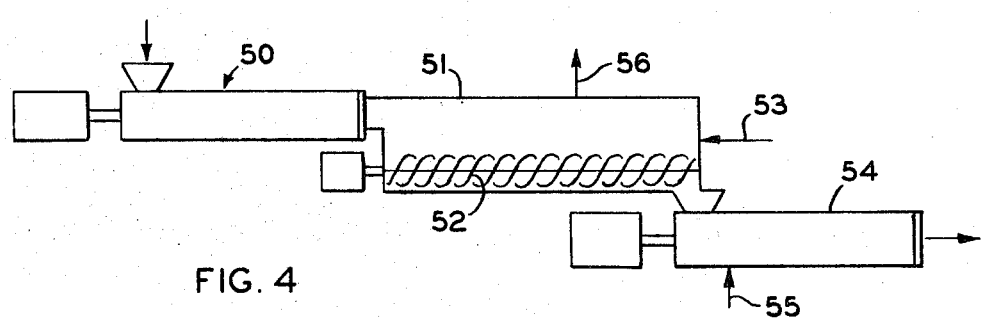

FIG. 4 depicts another embodiment of the method varying somewhat from that shown in FIG. 3. In FIG. 4, elastomer enters a first extruder 50, wherein almost all of the volatiles are removed. The elastomer is discharged from the extruder 50 into an enclosure 51 which contains a screw conveyor 52. A fine mist of hot water, steam and/or inert gas in introduced at an inlet 53, and the mixture of the material so introduced, together with any remaining volatiles released from the elastomer particles, is withdrawn from vent 56. The elastomer falls into the second extruder 54 wherein oil is added to it through inlet 55, and the oil-elastomer mixture is discharged.

A still further optional embodiment (not shown in the drawings) features the addition of solid compounding ingredients to the elastomer. While these ingredients can be added at any point during the devolatilizing process, the addition of high-volume fillers, such as carbon black, is preferably done early in the process, and the volcanizing ingredients are preferably added later in the process. The preferred schedule of additions permits better mixing of the fillers, since the elastomer accepts fillers more readily when the volatiles are still present. Also, a late addition of vulcanizing ingredients lessens the chance of prevulcanization or "scorch."

Although the entering elastomer in the process above described contains 100 parts of volatile solvent per 100 parts of elastomer, when 40 parts of oil and 70 parts of carbon black are admixed the 100 parts of volatile solvent represents only 47.7 percent by weight based on the total weight of the solid materials. Thus, the mixture to be de-volatilized is within the contemplated range of volatile content. While the addition of oil tends to soften the mixture, the presence of carbon black has the opposite effect, producing a tougher material with greater resistance to deformation.

As an example of the addition of solid compounding ingredients to the elastomer, the following process is described. All parts and percentages are by weight, unless otherwise indicated. A mixture of 100 parts of an 80/20 butadiene/styrene copolymer and 100 parts of volatile solvent is to be desolventized. The mixture, together with 70 parts of carbon black, is charged into the hopper of a first extruder. Forty parts of oil is injected into the extruder, and the whole undergoes a mixing operation in the first extruder. The admixture of carbon black, normally a difficult mixing task, is facilitated by the presence of oil and the volatile solvent. The combined mixture of elastomer, volatile solvent, oil and carbon black is discharged from the first extruder into the hopper of a second extruder. The two extruders can be sealed together, or a transfer conveyor can be provided. Since the mixture will be heated by the mixing action, volatile vapors leaving the mixture can be collected at this point.

In the second extruder, water or inert gas in introduced as before, with a vent section following each inlet section. The vulcanizing chemicals can be added near the end of the second extruder to avoid "scorch." The elastomer exiting the second extruder is quickly cooled in air and is fully compounded and ready to process.

What is claimed is:

1. The method of continuously removing volatile hydrocarbons contained in an elastomer comprising the successive steps of
    charging the elastomer into an extruder,
    mechanically working the elastomer whereby its temperature is increased, adding water through an inlet in the extruder and mixing the water with the elastomer,
    allowing vapors to flash from the mixture thus formed and escape through a vented section in the extruder and
    discharging the elastomer from the end of the extruder at a lower content of volatile hydrocarbons.

2. The method of claim 1, wherein the mixture is subjected to a plurality of mechanical work operations, each followed by a flash operation.

3. The method of claim 1, wherein the elastomer as charged contains from about 10 per cent to about 50 per cent volatile hydrocarbons, by weight.

4. The method of claim 1, wherein the elastomer as discharged contains less than about 1.5 per cent volatile hydrocarbons.

5. The method of claim 1, wherein the elastomer is polybutadiene or a copolymer of butadiene and styrene.

6. The method of claim 1, wherein the volatile hydrocarbons consist essentially of hexane or pentane.

7. The method of claim 1, with the additional step of adding oil at another inlet in the extruder.

8. The method of claim 1, wherein the elastomer discharged from the end of the extruder is fed into a second extruder, and oil is introduced at an inlet in the second extruder, whereby an oil-elastomer mixture is produced.

9. The method of claim 1, wherein elastomer fines which pass through the vented section in the extruder are recycled.

10. The method of claim 1, wherein solid compounding ingredients are added to the elastomer during the process.

11. The method of claim 1, with the previous step of admixing oil and filler into the elastomer.

12. The method of continuously removing volatile hydrocarbons contained in an elastomer comprising the successive steps of
    charging an elastomer which contains residual initiator into an extruder,
    mechanically working the elastomer whereby its temperature is increased, adding an inert gas through an inlet in the extruder and mixing the inert gas with the elastomer,
    allowing vapors to flash from the mixture thus formed and escape through a vented section in the extruder, and
    discharging the elastomer from the end of the extruder at a lower content of volatile hydrocarbons.

13. The method of claim 12, wherein the elastomer is polybutadiene or a copolymer of butadiene and styrene.

14. The method of claim 12, wherein the inert gas is nitrogen.

* * * * *